(12) United States Patent
Zhao et al.

(10) Patent No.: US 8,306,643 B2
(45) Date of Patent: Nov. 6, 2012

(54) METHOD FOR DESIGNING A LIGHT GUIDE PLATE AND METHOD FOR MANUFACTURING THE SAME

(75) Inventors: Yan Zhao, Beijing (CN); Jun Zhu, Beijing (CN); He Zhang, Beijing (CN); Guo-Fan Jin, Beijing (CN)

(73) Assignees: Tsinghua University, Bejing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 528 days.

(21) Appl. No.: 12/584,741

(22) Filed: Sep. 11, 2009

(65) Prior Publication Data

US 2010/0070060 A1      Mar. 18, 2010

(30) Foreign Application Priority Data

Sep. 12, 2008   (CN) .......................... 2008 1 0216087

(51) Int. Cl.
*G06F 19/00* (2011.01)
(52) U.S. Cl. .......................... 700/97; 362/615
(58) Field of Classification Search .................. 700/97; 362/615
See application file for complete search history.

(56) References Cited

U.S. PATENT DOCUMENTS

| 6,167,182 A | 12/2000 | Shinohara et al. |
| 2006/0203317 A1 | 9/2006 | Hirota et al. |

FOREIGN PATENT DOCUMENTS

| JP | 11-231797 | 8/1999 |
| JP | 2005-158310 | 6/2005 |
| JP | 2005-284283 | 10/2005 |
| JP | 2007-26702 | 2/2007 |
| JP | 2007-329114 | 12/2007 |
| JP | 2008-210568 | 9/2008 |
| TW | 200815791 | 4/2008 |
| WO | WO9819105 | 5/1998 |

OTHER PUBLICATIONS

Feng et al., "Novel integrated light-guide plate for liquid crystal display backlight", Journal of Optics A: Pure and Applied Optics, 2005.*

* cited by examiner

*Primary Examiner* — Carlos Ortiz Rodriguez
(74) *Attorney, Agent, or Firm* — Altis Law Group, Inc.

(57) ABSTRACT

A method for designing a light guide plate includes the following steps. A raw light guide plate having a light input surface and a light output surface is provided. A region of the light input surface is divided into several annuluses according to a luminance distribution $E(\rho,\theta)$ of the light output surface. A scattering dots density $D(\rho,\theta)$ of each annulus on the light input surface is figured out. A total number N of the scattering dots of each annulus on the light input surface are gained, and the scattering dots is randomly distributed in the each annulus defined on the light input surface, whereby a designed light guide plate is obtained.

16 Claims, 6 Drawing Sheets

```
┌─────────────────────────────────────────────┐
│ providing a raw light guide plate having a  │
│ light input surface and a light output surface │
└─────────────────────────────────────────────┘
                      │
                      ▼
┌─────────────────────────────────────────────┐
│ dividing a region of the light input surface │
│ into several annuluses according to a        │
│ luminance distribution of the light output   │
│ surface                                      │
└─────────────────────────────────────────────┘
                      │
                      ▼
┌─────────────────────────────────────────────┐
│ determining a effective density of scattering│
│ dots for each annulus defined on the light   │
│ input surface                                │
└─────────────────────────────────────────────┘
                      │
                      ▼
┌─────────────────────────────────────────────┐
│ calculating a total number of the scattering │
│ dots needed for each annulus according to    │
│ the effective density, and randomly          │
│ distributing the scattering dots on each     │
│ annulus defined on the light input surface,  │
│ whereby a designed light guide plate is      │
│ obtained                                     │
└─────────────────────────────────────────────┘
```

FIG. 1

METHOD FOR DESIGNING A LIGHT GUIDE PLATE AND METHOD FOR MANUFACTURING THE SAME

BACKGROUND

1. Technical Field

The present disclosure relates to a method for designing a light guide plate and a method for manufacturing the same.

2. Description of Related Art

Currently, because liquid crystal displays (LCDs) are thin, lightweight, long lasting and consume little power, they are extensively used in a variety of electronic devices. However, backlight modules are typically required because liquid crystals are not self-luminescent. Generally, backlight modules can be categorized as either direct-type backlight modules or edge-type backlight modules according to the placement of the light sources. The direct-type backlight modules are more widely employed in numerous applications because direct-type backlight modules can provide high illumination in comparison with edge-type backlight modules.

A light guide plate is a core component in a backlight module, the main function of which is to convert a linear light source or a point light source into a planar light source with good illuminance uniformity. A light guide plate for a direct-type backlight module according to a related art includes a top surface, a light input surface opposite to the top surface, and at least one side connecting the light input surface and the top surface. At least one of the light input surface and the top surface includes a plurality of scattering dots. The distribution of the scattering dots on a corresponding surface of the light guide plate remarkably affects the illuminance uniformity and efficiency of the light guide plate. However, in the related art, the distribution of the scattering dots on the surface of the light guide plate does not provide uniform light output from the light guide plate, thereby reducing the uniformity of illumination of the direct-type backlight module.

What is needed, therefore, is to provide a method for designing and manufacturing a light guide plate which has an improved uniformity of illumination.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments.

FIG. 1 is a flow chart of one embodiment of a method for designing a light guide plate.

DETAILED DESCRIPTION

Figure 2:
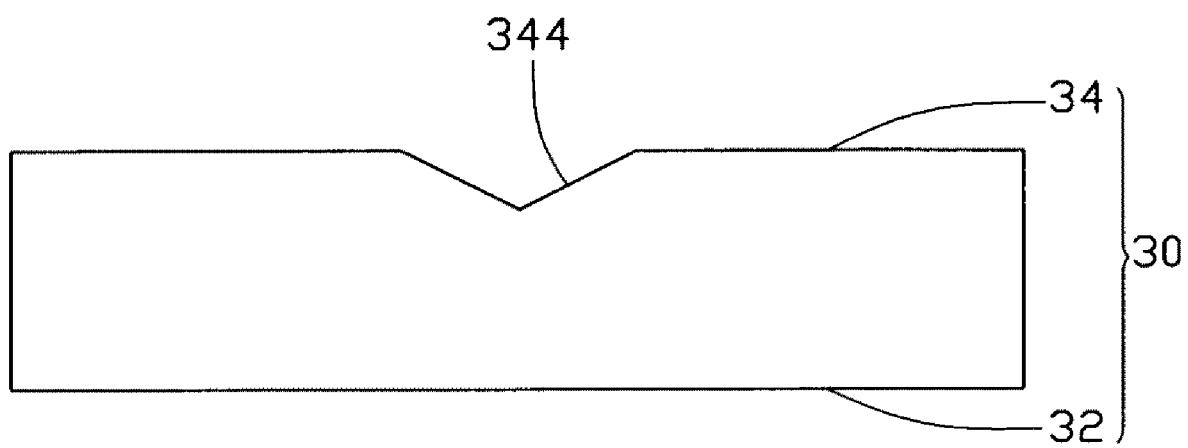
FIG. 2 is a schematic view of a raw light guide plate without dots.
Figure 3:
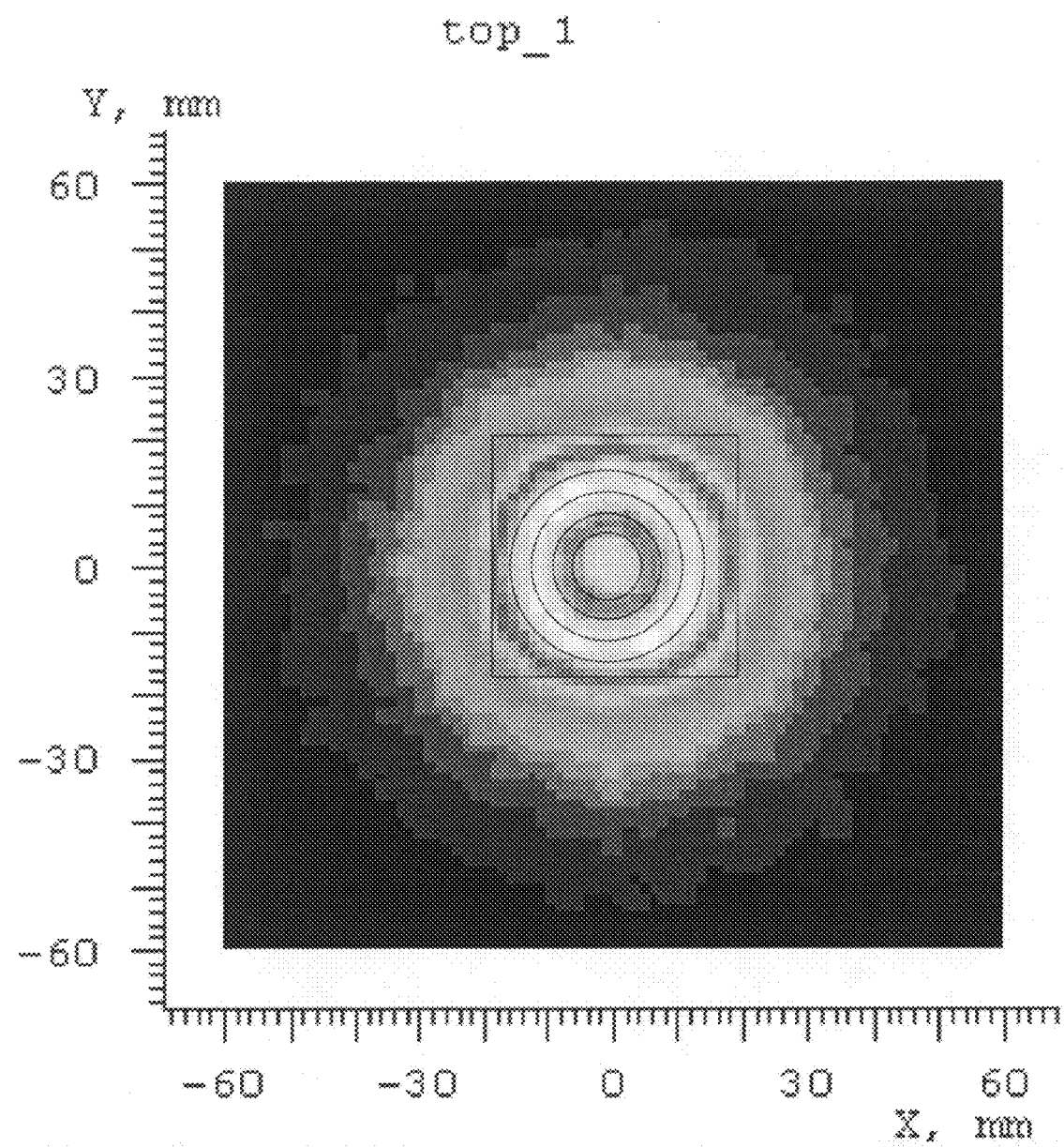
FIG. 3 is a schematic view of illuminance distribution of a light output surface of the raw light guide plate of FIG. 2.
Figure 4:
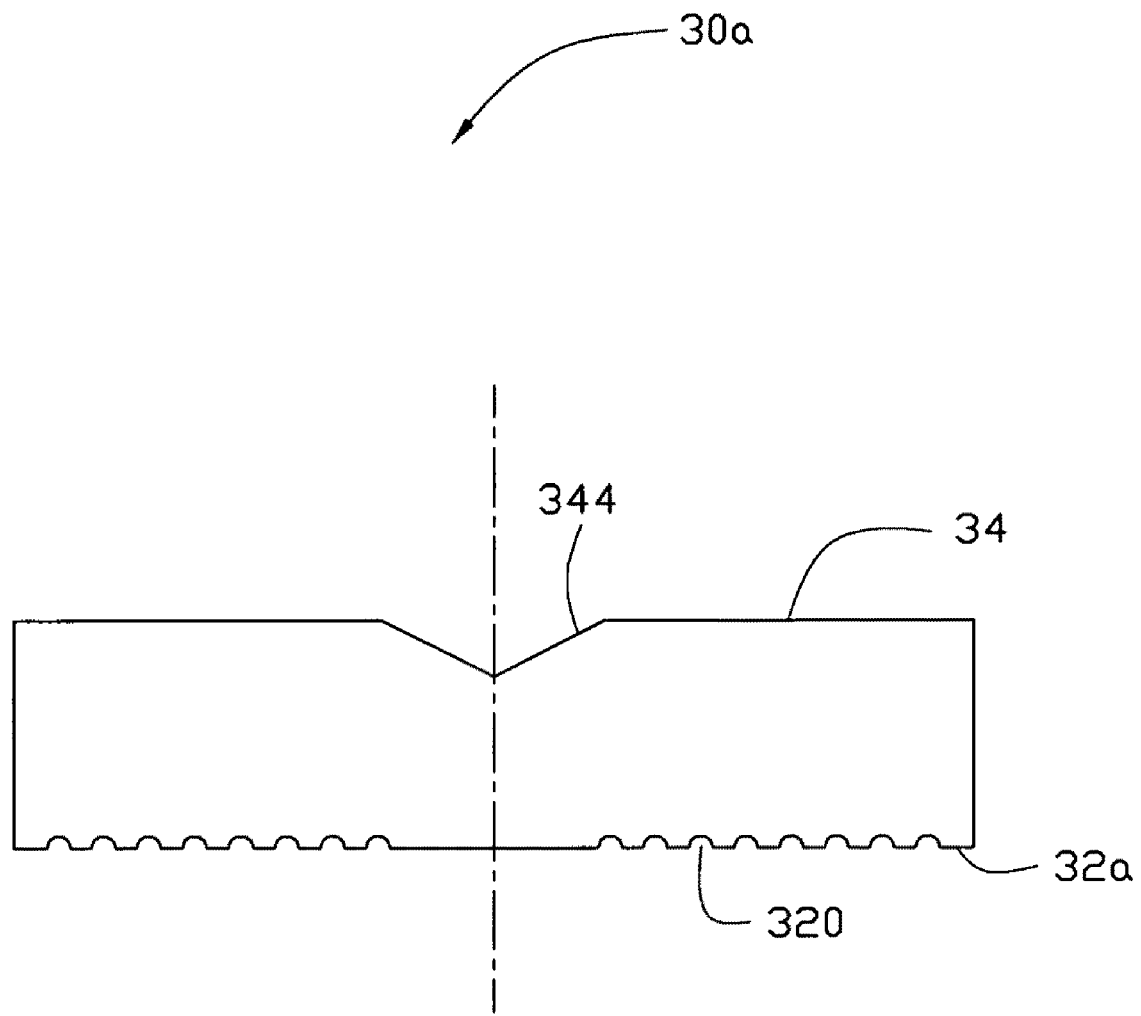
FIG. 4 is a schematic view of the light guide plate designed by the method of FIG. 1.

Referring to FIG. 1 and FIG. 2, a method for designing a light guide plate includes:

(a) providing a raw light guide plate 30 as shown in FIG. 2, the raw light guide plate 30 has a light input surface 32 and a light output surface 34 substantially parallel to the light input surface 32;

(b) dividing the region of the light input surface 32 into several concentric annuluses according to an illuminance distribution $E(\rho,\theta)$, shown in FIG. 3, of the light output surface 34 by determining radii of concentric circles used to form the annuluses, where $\rho$ is the polar radius; and $\theta$ is the polar angle;

(c) determining a most effective density $D(\rho,\theta)$ for scattering dots 320 for each annulus defined on the light input surface 32; and (d) calculating a total number N of the scattering dots 320 needed for each annulus according to effective density, and randomly distributing the scattering dots 320 on each annulus achieving design of a new light guide plate 30a as shown in FIG. 4.

In step (a), the raw light guide plate 30 is a transparent plate having a round, square, rectangle, polygon, or other shape. The raw light guide plate 30 may be made of plastic, polymethyl methacrylate (PMMA), or glass. The thickness of the raw light guide plate 30 is arbitrary and can be selected according to need. The raw light guide plate 30 can be used in a direct-type backlight module. The light output surface 34 is opposite and substantially parallel to the light input surface 32. A cone-shaped pit 344 is defined in the raw light guide plate 30 at the center of the light output surface 34. The cross-sectional area of the cone-shaped groove 344 substantially parallel to the light input surface 32 gradually increases along a direction from the light input surface 32 to the light output surface 34.

In one embodiment, the raw light guide plate 30 is a square PMMA plate having a side length of about 30 millimeters. The thickness of the raw light guide plate 30 may be about 5 millimeters.

Step (b) includes (b1) determining the illuminance distribution $E(\rho,\theta)$ of the light output surface 34 when there are no scattering dots 320 on the light input surface 32 and (b2) dividing the region of the light input surface 32 into several annuluses by calculating radii of concentric circles according to the illuminance distribution $E(\rho,\theta)$ of the light output surface 34, wherein the space of each two adjacent concentric circles form an annulus.

In step (b1), $E(\rho,\theta)$ represents the illuminance distribution of the light output surface 34 when there are no scattering dots 320 on the light input surface 32, with the center of the light output surface 34 or the light input surface 32 as a pole.

Step (b2) includes (b21) selecting a maximum and minimum illuminance $E_{max}$ and $E_{min}$ of the light output surface 34 and (b22) calculating a diameter $r_n$ of each concentric circle to be formed using the formulas below:

$$\Delta E = \frac{E_{max} - E_{min}}{a} \quad (1)$$

$$\rho = 0, E(0) = E_0 \quad (2)$$
$$\rho = r_1, |E(r_1) - E_0| = \Delta E;$$
$$\rho = r_2, |R(r_2) - E_0| = 2\Delta E;$$
$$\cdots .$$

$$\rho = r_n, |E(r_n) - E_0| = n\Delta E \quad (3)$$

In step (b22), $\Delta E$ is illuminance difference between two adjacent annuluses where a is the number of the annuluses. When the illuminance of the area of a certain circle $E(r_1)$ on the adjacent region of the center of the light output surface 34 of the light guide plate 30 satisfies the formula $|E(r_1)-E_0|=\Delta E$, where $E_0$ is the illuminance of the center point of the light output surface 34, the certain circle is called the first circle, and the region in the first circle is called the first annulus. In this analogy, the light output surface 34 of the raw light guide plate 30 can be divided into several concentric annuluses. The distribution region of scattering dots 320 on the light input surface 32 of the raw light guide plate 30 is divided into several concentric annuluses which are in accordance with the annuluses on the light output surface 34 of the raw light guide plate 30.

In one embodiment, the distribution region of the scattering dots 320 on the light input surface 32 is divided into five annuluses as shown in FIG. 3 according to the formulas of (1), (2) and (3). The radius range of each annulus is described in Table 1.

TABLE 1

| Region | Radius range (mm) |
|---|---|
| 1 | 2-4 |
| 2 | 4-8 |
| 3 | 8-10 |
| 4 | 10-13 |
| 5 | 13-15 |

In step (c), the scattering dots density $D(\rho,\theta)$ is defined as $$D(\rho,\theta) = \frac{S_{dot}}{S_a} \quad (4)$$

where $S_{dot}$ is the total area of all the scattering dots 320 in the annulus, and $S_a$ is the area of the annulus. In this embodiment, the shape of the scattering dots 320 is hemispherical and the optical properties of the dots fit the Lambertian scattering model. The radii of the scattering dots 320 are the same, i.e., 0.35 mm, which is common and easy for technological operation in the optical model.

The scattering dot distribution on the light input surface 32 of the raw light guide plate 30 only affects the illuminance of the area that is right above the scattering dot distribution area. The distribution of the scattering dots 320 is centrosymmetrical. The shape and distribution of the scattering dots 320 on the light input surface 32 of the raw light guide plate 30 remarkably affect the illuminance uniformity and efficiency of the light guide plate 30. The brighter the original average illuminance of the annuluses on the light output surface 34, the lower the scattering dots density of the corresponding annulus on the light input surface 32; the darker the original average illuminance of the annuluses on the light output surface 34, and the higher the scattering dots density of the corresponding annulus on the light input surface 32. Therefore, the scattering dots density $D(\rho,\theta)$ of each annulus can be decided according to the original illuminance distribution $E(\rho,\theta)$ of the light output surface 34 of the raw light guide plate 30. The relation between scattering dots density $D(\rho,\theta)$ and $E(\rho,\theta)$ is estimated as:

$$D(\rho,\theta) = \frac{k}{E(\rho,\theta)} \quad (5)$$

where k is a constant.

In this embodiment, the scattering dots density $D(\rho,\theta)$ of each annulus is determined according to the original illuminance distribution of the light output surface 34 of the raw light guide plate 30. The original scattering dots density distribution is described in Table 2.

TABLE 2

| Region | Radius range (mm) | Scattering dots density |
|---|---|---|
| 1 | 2-4 | 0.4 |
| 2 | 4-8 | 0.3 |
| 3 | 8-10 | 0.6 |
| 4 | 10-13 | 0.6 |
| 5 | 13-15 | 0.5 |

In step (d), the total number N of the scattering dots 320 of every annulus is determined according to the scattering dots density $D(\rho,\theta)$ of every annulus. The total number N of the scattering dots 320 of every annulus is determined after determining the dot density $D(\rho,\theta)$ of the annulus by $$N = \frac{S \times D(\rho,\theta)}{\pi \times R^2}. \quad (6)$$

where S is the area of the annulus, R is the radius of the scattering dot.

To eliminate the Moiré phenomenon caused by optical interference between the regular dot patterns and the liquid crystal cells matrices when the scattering dots 320 are arranged regularly in typical backlight modules, the random dot distribution is generated by a random function.

The coordinates of the $i_{th}$ scattering dot is represented by $(x_i,y_i)$, $i=1,2 \ldots N$. In order to eliminate the overlap of the scattering dots 320, a random function is used to produce the coordinates and meets the following regulation:

$$\sqrt{(x_p-x_q)^2+(y_p-y_q)^2} \geq 2R, p=1,2 \ldots N, q=1,2 \ldots N \quad (7)$$

When the scattering dots 320 are regularly arranged in every annulus, the arrangement of the scattering dots 320 of every annulus near the boundary is different from each other, which leads to uneven illuminance distribution of the light output surface 34 of the raw light guide plate 30. The uniformity of the illuminance can be improved by selecting a distribution after many randomizations.

In step (d), as the number of random distributions increase, the better the uniformity of illuminance. After the scattering dots density of every annulus has been defined, uniformity of the illuminance can be further improved by selecting a distribution among many random distributions. The scattering dot distribution whose illuminance uniformity is the highest is chosen as the final distribution. Different random scattering dot distributions are generated by the random function. A highest uniformity of the illuminance can be gained after many randomizations. Among the simulation results, the highest illuminance uniformity is 81%, and the distribution illuminance is $E'(\rho,\theta)$.

If the uniformity of the illuminance after step (d) reaches the desired value, the design is complete. If not, the method for designing a light guide plate further includes a step (e) of resetting the scattering dots density of each annulus, and randomly distributing the scattering dots 320 in the annulus on the light input surface 32.

In step (e), the average illuminance of the light output surface 34 of the raw light guide plate 30 is $\overline{E'_1}$ and the average illuminance of each annular partition is $\overline{E'_{11}}, \overline{E'_{21}}, \ldots, \overline{E'_{n1}}$ separately in the last simulated result of step (d). The scattering dots density of each annulus is recalculated using the following equations:

$$D_{12} = D_{11} \times \frac{E'_1}{E'_{11}};\qquad(8)$$

$$D_{22} = D_{21} \times \frac{E'_1}{E'_{21}};$$

$$\ldots$$

$$D_{n2} = D_{n1} \times \frac{E'_1}{E'_{n1}}$$

where $D_{11}, D_{21}, \ldots, D_{n1}$, are the initial scattering dots density of each annulus and $D_{12}, D_{22} \ldots, D_{n2}$ are the scattering new dot density of each annulus.

In step (e), the method for randomly distributing the scattering dots 320 in the annulus on the light input surface is the same as the method for randomly distributing the scattering dots 320 in the annulus of the step (d).

Figure 5:
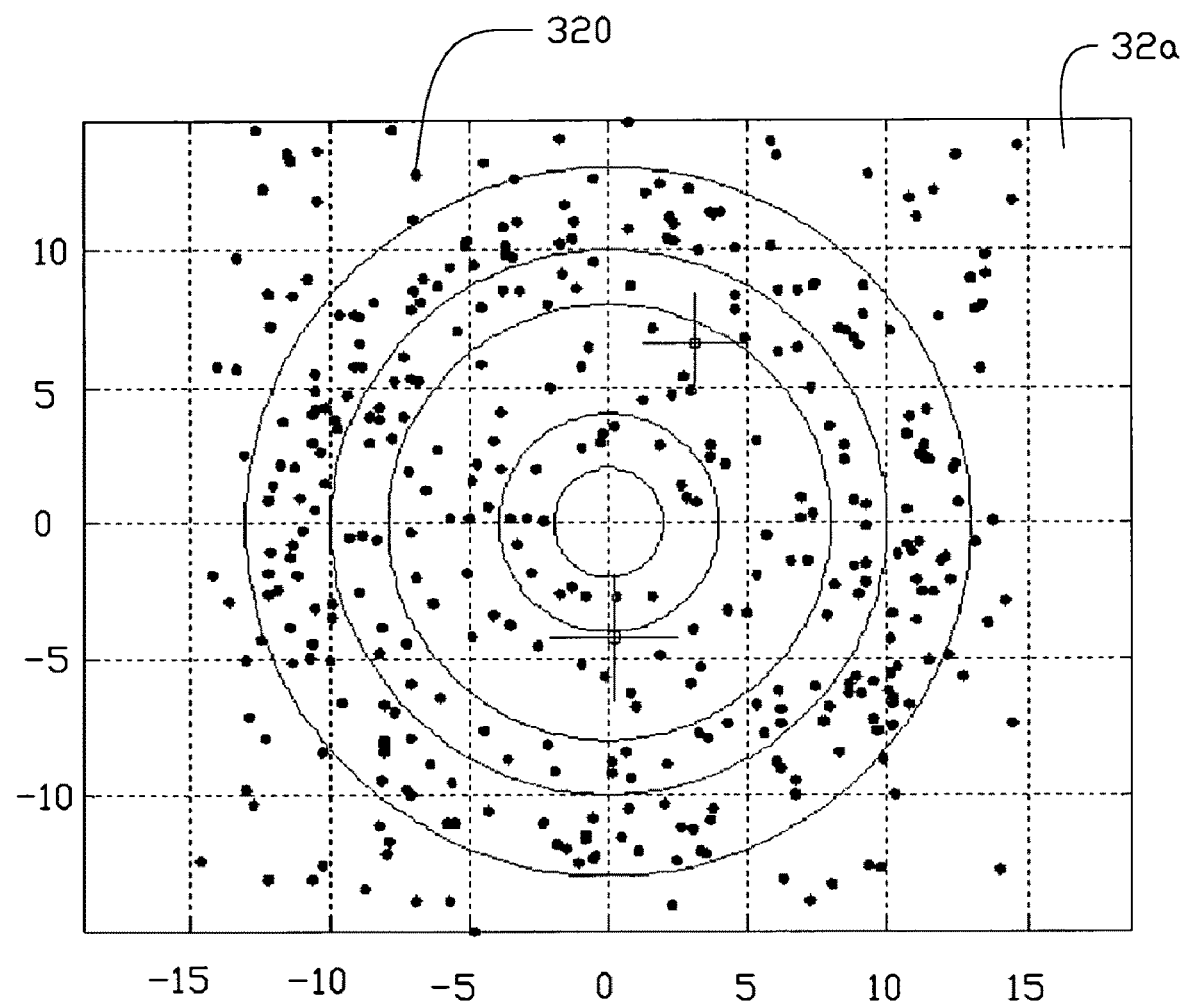
FIG. 5 is a schematic view of distribution of scattering dots on a light input surface of the light guide plate of FIG. 4.

If the uniformity of the illuminance cannot reach the desired value, according to the last simulated results, step (e) can be repeated, the scattering dots density of each annulus is recalculated, and the scattering dots 320 are redistributed, until the uniformity of the illuminance meets the requirement of the design. In this embodiment, an illuminance uniformity of 91% is achieved after step (e). The scattering dot arrangement is shown in FIG. 5.

Figure 6:
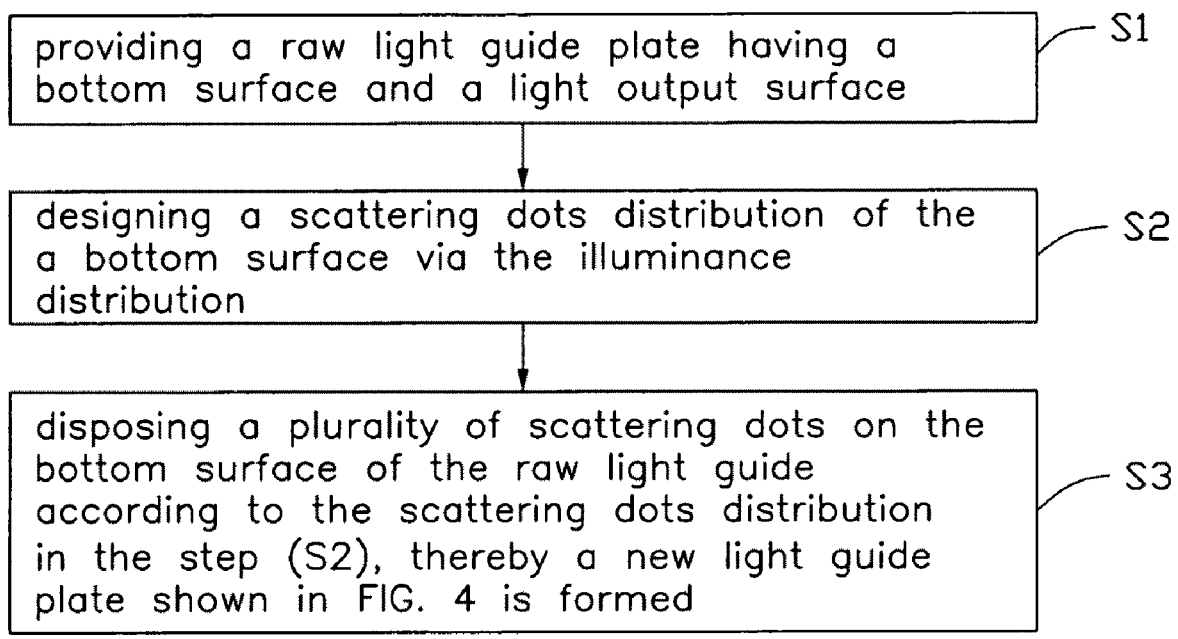
FIG. 6 is a flow chart of a method for manufacturing the light guide plate of FIG. 4.

Referring to FIG. 6, a method for making a light guide plate using the method of designing a light guide plate includes:

(S1) providing the raw light guide plate 30 having a light input surface 32 and a light output surface 34;

(S2) designing the scattering dot distribution of the light input surface 32 via the illuminance distribution of the light output surface 34; and (S3) disposing a plurality of scattering dots 320 on the light input surface 32 of the raw light guide 30 according to the scattering dot distribution in step (S2), whereby a new light guide plate 30a, as shown in FIG. 4, is formed.

In step (S2), the method of designing a scattering dot distribution of the light input surface 32 via the illuminance distribution of the light output surface 34 can be by the same method as the steps of (b), (c), (d) according to FIGS. 1-5.

In step (S3), the method of disposing the plurality of scattering dots 320 on the light input surface 32 includes screen printing, laser etch, or moulding.

As mentioned above, in the method for designing the light guide plate which can be used in direct illumination-type backlight modules, an annularly random scattering dot pattern has been generated on the light input surface of the light guide plate. The illuminance uniformity reaches 91% in the simulated result. Therefore, the method can improve illuminance uniformity as well as eliminate moiré patterns caused by optical interference between the dot patterns and the liquid-crystal cells matrixes. The method can also be applied to light guide plates in small- or medium-sized LCD systems in a similar way as described above.

It is to be understood that the above-described embodiments are intended to illustrate rather than limit the disclosure. Variations may be made to the embodiments without departing from the spirit of the disclosure as claimed. The above-described embodiments illustrate the disclosure but do not restrict the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A method for designing a light guide plate, the method comprising the steps of:
   (a) providing a raw light guide plate having a light input surface and a light output surface;
   (b) dividing the light output surface of the raw light guide plate into several annuluses, and dividing a region of the light input surface into several annuluses according to the annuluses of the light output surface and an illuminance distribution of the light output surface, wherein the step (b) comprises the step of: (b1) determining the illuminance distribution of the light output surface when there are no scattering dots on the light input surface;
   (c) determining an effective density of scattering dots for each annulus of the light input surface, the effective density of scattering dots defined as $$D(\rho, \theta) = \frac{S_{dot}}{S_a}$$

wherein, $D(\rho,\theta)$ is the effective density of scattering dots, $S_{dot}$ is a total area of all the scattering dots in the each annulus, and $S_a$ is an area of the each annulus, $\rho$ is a polar radius; and $\theta$ is a polar angle, with a center of the light output surface or the light input surface as a pole; and
   (d) calculating a total number of the scattering dots needed for the each annulus according to the effective density, and generating multiple scattering dot distributions by randomly distributing the calculated total number of the scattering dots on the each annulus of the light input surface; selecting one of the multiple scattering dot distributions with highest illuminance uniformity as a final distribution, whereby a designed light guide plate is obtained.

2. The method as claimed in claim 1, wherein the raw light guide plate has a round shape or polygonal shape.

3. The method as claimed in claim 1, wherein the light guide plate is used in a direct-type backlight module.

4. The method as claimed in claim 1, wherein the step (b) comprises the step of: (b2) dividing the region of the light input surface into several annular partitions according to the illuminance distribution of the light output surface.

5. The method as claimed in claim 4, wherein the step (b2) comprises the steps of: (b21) selecting a maximum and minimum illuminance of the light output surface; and (b22) determining a diameter of the annular partitions through the formulas below:

$$\Delta E = \frac{E_{max} - E_{min}}{a}$$

$$\rho = 0,\ E(0) = E_a$$

$$\rho = r_1,\ |E(r_1) - E_0| = \Delta E;$$

$$\rho = r_2,\ |E(r_2) - E_0| = 2\Delta E;$$

$$\ldots;$$

$$\rho = r_n,\ |E(r_n) - E_0| = n\Delta E$$

wherein $r_n$ is the diameter of the annular partitions, n is an annular partition number, E is illuminace of the light output surface, $E_{max}$ and $E_{min}$ are maximum and minimum illuminance of the light output surface, respectively, $E_0$ is an illuminance of a center point of the light output surface, a is a total number of annuluses, $\Delta E$ is illuminance difference between two adjacent annuluses, $\rho$ is a polar radius.

6. The method as claimed in claim 1, wherein a relation between the scattering dots density and the illuminance distribution of the light output surface is estimated as $$D(\rho, \theta) = \frac{k}{E(\rho, \theta)}$$

where $D(\rho,\theta)$ is the scattering dots density, $E(\rho,\theta)$ is the illuminance distribution of the the light output surface, k is a constant, $\rho$ is a polar radius and $\theta$ is a polar angle, with a center of the light output surface or the light input surface as a pole.

7. The method as claimed in claim 1, wherein the total number of the scattering dots of the each annulus is determined by the formula $$N = \frac{S \times D(\rho, \theta)}{\pi \times R^2}$$

wherein N is the total number of scattering dots of the each annulus, $D(\rho,\theta)$ is the density of scattering dots, S is an area of an annulus, R is a radius of a scattering dot, $\rho$ is a polar radius; and $\theta$ is a polar angle, with a center of the light output surface or the light input surface as a pole.

8. The method as claimed in claim 1, wherein a random function is used by the step for randomly distributing the scattering dots in the annulus on the light input surface, the random function meeting regulation of $$\sqrt{(x_p - x_q)^2 + (y_p - y_q)^2} \geq 2R, p=1,2\ldots N, q=1,2\ldots N$$

wherein $x_p, y_p, x_q, y_q$ are coordinates of the $i_{th}$ scattering dot, and R is a radius of a scattering dot.

9. A method for designing a light guide plate, the method comprising the steps of:
(a) providing a raw light guide plate having a light input surface and a light output surface;
(b) dividing the light output surface of the raw light guide plate into several annuluses, and dividing a region of the light input surface into several annuluses according to the annuluses of the light output surface and an illuminance distribution of the light output surface, wherein the step (b) comprises the step of: (b1) determining the illuminance distribution of the light output surface when there are no scattering dots on the light input surface;
(c) determining a density of scattering dots for each annulus on the light input surface;
(d) calculating a total number of scattering dots for the each annulus of the light input surface according to the determined density, and randomly distributing the calculated total number of scattering dots in the each annulus on the light input surface, the density for scattering dots defined as $$D(\rho, \theta) = \frac{S_{dot}}{S_a}$$

wherein, $D(\rho,\theta)$ is the density of scattering dots, $S_{dot}$ is a total area of all the scattering dots in the each annulus, and $S_a$ is an area of the each annulus, $\rho$ is a polar radius; and $\theta$ is a polar angle, with a center of the light output surface or the light input surface as a pole; and
(e) resetting the density of scattering dots of the each annulus and generating multiple scattering dot distributions by randomly distributing the calculated total number of the scattering dots in the each annulus on the light input surface, and selecting one of the multiple scattering dot distributions with highest illuminance uniformity as a final distribution.

10. The method as claimed in claim 9, wherein the step (b) comprises the step of: (b2) dividing the region of the light input surface into several annular partitions according to the illuminance distribution of the light output surface.

11. The method as claimed in claim 10, wherein the step (b2) comprises the steps of: (b21) selecting a maximum and minimum illuminance of the light output surface; (b22) determining a diameter of the annular partitions through the formulas below:

$$\Delta E = \frac{E_{max} - E_{min}}{a}$$

$$\rho = 0, E(0) = E_0$$

$$\rho = r_1, |E(r_1) - E_0| = \Delta E;$$

$$\rho = r_2, |E(r_2) - E_0| = 2\Delta E;$$

$$\ldots ;$$

$$\rho = r_n, |E(r_n) - E_0| = n\Delta E$$

wherein $E_{max}$ and $E_{min}$ are maximum and minimum illuminance of the light output surface, respectively, $r_n$ is the diameter of the annular partitions, n is an annular partition number, E is illuminace of the light output surface, $E_0$ is an illuminance of a center point of the light output surface, $\Delta E$ is illuminance difference between two adjacent annuluses a is a number of annuluses, $\rho$ is a polar radius with a center of the light output surface or the light input surface as a pole.

12. The method as claimed in claim 9, wherein a relation between the scattering dots density and the illuminance distribution of the light output surface is estimated as $$D(\rho, \theta) = \frac{k}{E(\rho, \theta)}$$

wherein $D(\rho,\theta)$ is the scattering dots density, $E(\rho,\theta)$ is the illuminance distribution of the light output surface, k is a constant, $\rho$ is a polar radius and $\theta$ is a polar angle, with a center of the light output surface or the light input surface as a pole.

13. The method as claimed in claim 9, wherein the total number of the scattering dots of the each annulus is determined by the formula $$N = \frac{S \times D(\rho, \theta)}{\pi \times R^2}$$

wherein N is the total number of scattering dots of the each annulus, $D(\rho,\theta)$ is the density of scattering dots, S is an area of an annulus, R is a radius of a scattering dot, $\rho$ is a polar radius; and θ is a polar angle, with a center of the light output surface or the light input surface as a pole.

14. The method as claimed in claim 9, wherein a random function is used by the step for randomly distributing the scattering dots in the each annulus on the light input surface, the random function meeting regulation of $$\sqrt{(x_p-x_q)^2+(y_p-y_q)^2} \geq 2R, p=1,2\ldots N, q=1,2\ldots N$$

wherein $x_p, y_p, x_q, y_q$ are coordinates of the $i_{th}$ scattering dot, and R is a radius of a scattering dot.

15. The method as claimed in claim 9, in step (e), wherein the scattering dots density of the each annulus is recalculated by the following regulations:

$$D_{12} = D_{11} \times \frac{\overline{E'_1}}{\overline{E'_{11}}};$$

$$D_{22} = D_{21} \times \frac{\overline{E'_1}}{\overline{E'_{21}}};$$

$$\ldots$$

$$D_{n2} = D_{n1} \times \frac{\overline{E'_1}}{\overline{E'_{n1}}}.$$

wherein $D_{11}, D_{21}, \ldots, D_{n1}$ are initial scattering dots density of the each annulus, $D_{12}, D_{22}, \ldots, D_{n2}$ are scattering new dot density of each annulus, $\overline{E'_1}$ is an average illuminance of the light output surface of the light guide plate, and $\overline{E'_{11}}$, $\overline{E'_{21}}, \ldots, \overline{E'_{n1}}$ are average illuminances of annular partitions.

16. A method for making a light guide plate, the method comprising the steps of:
(S1) providing a raw light guide plate having a light input surface and a light output surface;
(S2) designing a scattering dot distribution of the light input surface via an illuminance distribution of the light output surface, wherein the step (S2) comprises sub-steps of:
(a) dividing the light output surface of the raw light guide plate into several annuluses,
(b) dividing a region of the light input surface into several annulus according to the annuluses of the light output surface and the illuminance distribution of the light output surface, the illuminance distribution of the light output surface determined when there are no scattering dots on the light input surface;
(c) determining a density for scattering dots of each annulus on the light input surface; and
(d) calculating a total number of scattering dots for the each annulus on the light input surface according to the determined density; generating multiple scattering dot distributions by randomly distributing the calculated total number of the scattering dots in the each annulus on the light input surface; selecting one of the multiple scattering dot distributions with highest illuminance uniformity as a final distribution; and
(S3) disposing a plurality of scattering dots on the light input surface of the raw light guide plate according to the final distribution in the step (S2).

* * * * *